(12) United States Patent
Kamath et al.

(10) Patent No.: US 11,494,069 B2
(45) Date of Patent: Nov. 8, 2022

(54) SYSTEM AND METHOD FOR FIRE INCIDENT MITIGATION

(71) Applicant: Aztek Securities, LLC, Baton Rouge, LA (US)

(72) Inventors: Nitin Kamath, Baton Rouge, LA (US); Aparna Kamath, Baton Rouge, LA (US); Sachin Kamath, Prairieville, LA (US)

(73) Assignee: Aztek Securities, LLC, Baton Rouge, LA (US)

( * ) Notice: Subject to any disclaimer, the term of this patent is extended or adjusted under 35 U.S.C. 154(b) by 176 days.

(21) Appl. No.: 17/130,285

(22) Filed: Dec. 22, 2020

(65) Prior Publication Data

US 2022/0193474 A1 Jun. 23, 2022

(51) Int. Cl.

| | |
|---|---|
| *G06F 3/048* | (2013.01) |
| *G06F 3/04847* | (2022.01) |
| *G06F 3/14* | (2006.01) |
| *G06Q 10/06* | (2012.01) |
| *G06F 3/01* | (2006.01) |
| *A62C 99/00* | (2010.01) |
| *G06Q 50/26* | (2012.01) |
| *A62C 3/02* | (2006.01) |

(52) U.S. Cl.
CPC ............ *G06F 3/04847* (2013.01); *G06F 3/14* (2013.01); *G06Q 10/0631* (2013.01); *A62C 3/0292* (2013.01); *A62C 99/009* (2013.01); *G06Q 50/26* (2013.01)

(58) Field of Classification Search
CPC ... G06F 3/04847; G06F 3/14; G06Q 10/0631; G06Q 50/26; A62C 3/0292; A62C 99/009
See application file for complete search history.

(56) References Cited

U.S. PATENT DOCUMENTS

| | | | | |
|---|---|---|---|---|
| 4,888,706 | A * | 12/1989 | Rush | G01F 15/06 700/283 |
| 2004/0143385 | A1 * | 7/2004 | Smyth | G08G 1/0116 701/117 |
| 2006/0077095 | A1 * | 4/2006 | Tucker | G01C 15/00 342/357.48 |
| 2006/0265489 | A1 * | 11/2006 | Moore | H04L 67/1095 709/223 |
| 2007/0036118 | A1 * | 2/2007 | Shaffer | H04W 4/08 370/338 |

(Continued)

*Primary Examiner* — Nicholas Augustine
(74) *Attorney, Agent, or Firm* — Ellenoff Grossman & Schole LLP; James M. Smedley; Alex Korona

(57) ABSTRACT

An emergency incident system is disclosed. The emergency incident system has an emergency incident module, comprising computer-executable code stored in non-volatile memory, a computing device, a sensor assembly, and one or more user devices. The emergency incident module, the computing device, the sensor assembly, and the one or more user devices are configured to sense data of environmental conditions, receive input of a first parameter data from one or more users, determine at least one fluid throw based on the sensed data and the first parameter data, display the at least one fluid throw to the one or more users, receive input of a second parameter data from the one or more users, and update the at least one fluid throw based on the sensed data and the second parameter data.

20 Claims, 10 Drawing Sheets

(56) References Cited

U.S. PATENT DOCUMENTS

| | | | |
|---|---|---|---|
| 2013/0186651 A1* | 7/2013 | Cerrano | A62C 33/00 169/16 |
| 2014/0180914 A1* | 6/2014 | Abhyanker | G05D 1/102 705/332 |
| 2015/0231430 A1* | 8/2015 | Cook | A62C 25/00 169/24 |
| 2016/0175633 A1* | 6/2016 | Smith | A62C 3/0214 169/61 |
| 2017/0311131 A1* | 10/2017 | South | G01S 5/14 |

* cited by examiner

Weather: Clear Sky  Temperature: 60.9°F (Min: 55.4°F, Max: 64°F)  Humidity: 76%
Wind: 3.36 M/H  Wind Direction: 30 Deg  Lat/Long: 30.45, -91.15

SYSTEM AND METHOD FOR FIRE INCIDENT MITIGATION

TECHNICAL FIELD

The present disclosure is directed to a system and method for mitigation of an incident, and more particularly, to a system and method for fire incident mitigation.

BACKGROUND OF THE DISCLOSURE

Conventional techniques for coordinating an effective response to a fire, for example by fire departments, municipalities, and other government agencies, typically rely on paper maps that are issued and managed by various agencies and organizations. Conventional systems suffer from confusion between new information and data and stale information and data as new maps are printed and distributed while old maps are still used or new data is incorrectly annotated by hand on existing old maps. For example during a fire incident, new data may be incorrectly added or incorporated into paper maps used by agencies and fire department management coordinating a response to a fire.

Further, distribution of new data to various agencies and organizations involved in responding to and fighting a fire is cumbersome and time-consuming. For example, printing updated maps and making notations on existing maps may delay a response to a fire incident. Also, tracking and coordinating information, data, and activities between various agencies typically delays providing useful information to firefighters and other responders. Incorrect information may also be provided based on errors made in adding information by hand to paper maps. Also, attempting to visualize data from several different fluid throw parameters is typically time-consuming and analysis accuracy is often unreliable due to human error in attempting to add information by hand to paper maps. Further, maintaining different paper maps having customized information and/or map scales for use by different agencies is cumbersome. Also, maintaining different paper maps for different scenarios and/or for training is burdensome.

The exemplary disclosed system and method of the present disclosure is directed to overcoming one or more of the shortcomings set forth above and/or other deficiencies in existing technology.

SUMMARY OF THE DISCLOSURE

In one exemplary aspect, the present disclosure is directed to an emergency incident system. The system includes an emergency incident module, comprising computer-executable code stored in non-volatile memory, a computing device, a sensor assembly, and one or more user devices. The emergency incident module, the computing device, the sensor assembly, and the one or more user devices are configured to sense data of environmental conditions, receive input of a first parameter data from one or more users, determine at least one fluid throw based on the sensed data and the first parameter data, display the at least one fluid throw to the one or more users, receive input of a second parameter data from the one or more users, and update the at least one fluid throw based on the sensed data and the second parameter data.

In another aspect, the present disclosure is directed to a method. The method includes sensing data of environmental conditions using a sensor assembly, receiving input of a first parameter data from one or more users, determining at least one first fluid throw based on the sensed data and the first parameter data using a computing device, displaying the at least one first fluid throw to the one or more users via one or more user devices, receiving input of a second parameter data from the one or more users, determining at least one second fluid throw based on the sensed data and the second parameter data using a computing device, and displaying the at least one second fluid throw to the one or more users via the one or more user devices.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

DETAILED DESCRIPTION AND INDUSTRIAL APPLICABILITY

The exemplary disclosed system and method may be a real-time and/or near real-time fluid throw analysis system for fire incident mitigation. The exemplary disclosed system and method may be used by users such as first responders and emergency personnel on-site at a fire incident for real-time geographic and situational data analysis. The system may utilize cellular, internet connection, and/or any other suitable communication techniques to provide users with real-time and/or near real-time access (e.g., instant access) to information pertaining to an emergency incident. For example, the exemplary disclosed system and method may be an iResponse-Throw system that enhances users' capability to quickly detect, analyze, and share response activities and tasks in real-time and/or near real-time.

Figure 1:
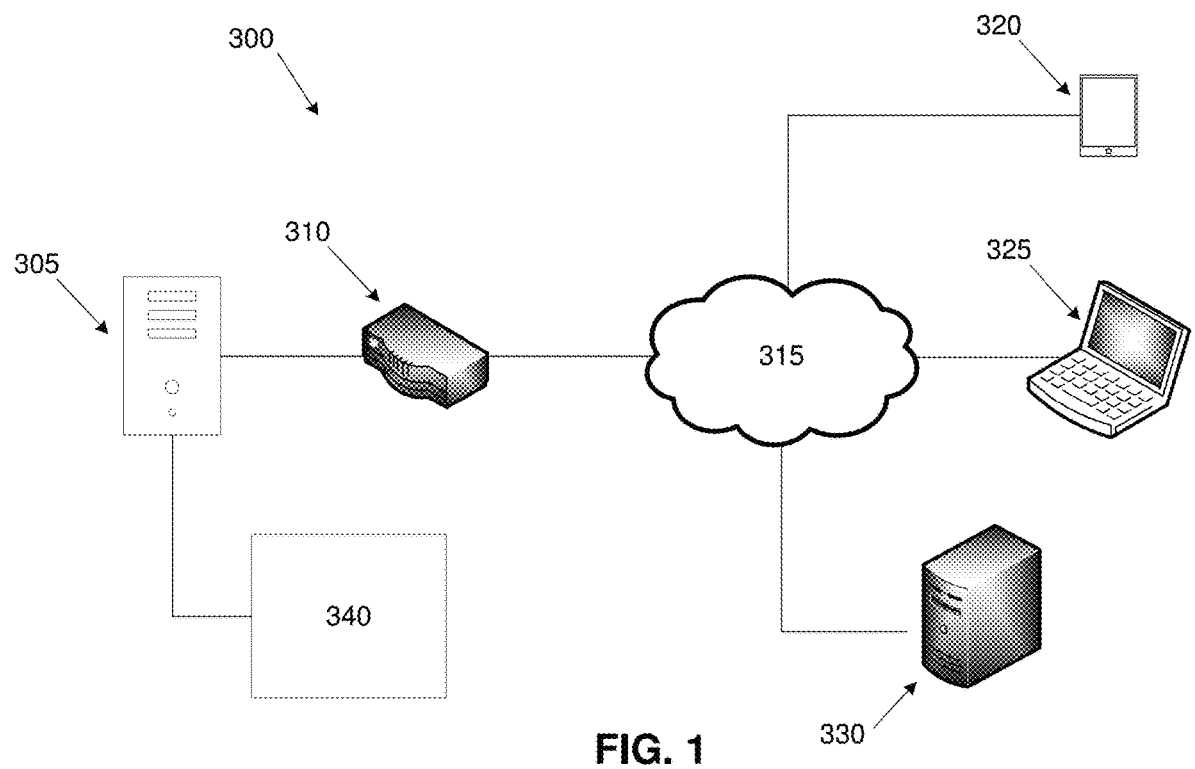
FIG. 1 is a schematic illustration of at least some exemplary embodiments of the present disclosure.

FIG. 1 illustrates an exemplary embodiment of the exemplary disclosed system and method. System 300 may include a computing device 305, a router 310, a network component 315, one or more user devices (e.g., one or more user devices 320, one or more user devices 325, and/or one or more user devices 330), and a sensor assembly 340. Computing device 305 and user devices 320, 325, and 330 may communicate via router 310 and network component 315. Sensor assembly 340 may collect and provide data for use by computing device 305.

Computing device 305 may provide functionality for user devices 320, 325, and/or 330. System 300 may include a web-based architecture utilizing a client-server model. Computations of computing device 305 (e.g., a single overall group of computations or a computation) may be distributed across multiple devices such as user devices 320, 325, and/or 330. Computing device 305 may be a server. Computing device 305 may provide various functionalities and services such as, for example, sharing data and resources among multiple clients and/or performing computations for a client. Computing device 305 may serve multiple clients (e.g., user devices 320, 325, and/or 330) simultaneously, thereby sharing data in real-time and/or near real-time. In addition to the exemplary disclosed computational functionality, computing device 305 that may be a server may host a module and/or database that stores some or substantially all of the data utilized in an operation of system 300. System 300 may be a computer system that may be hosted from a central location (e.g., computing device 305) and one or more clients may access service (e.g., via user devices 320, 325, and/or 330) using a network (e.g., network component 315).

System 300 may include one or more modules that may be partially or substantially entirely integrated with one or more components of system 300 such as, for example, computing device 305 (and/or any other suitable components of system 300 such as network component 315). The one or more modules may be software modules as described for example below regarding FIG. 10. For example, the one or more modules may include computer-executable code stored in non-volatile memory. The one or more modules may also operate using a processor. The one or more modules may store data and/or be used to control some or all of the exemplary disclosed processes described herein.

Figure 2:
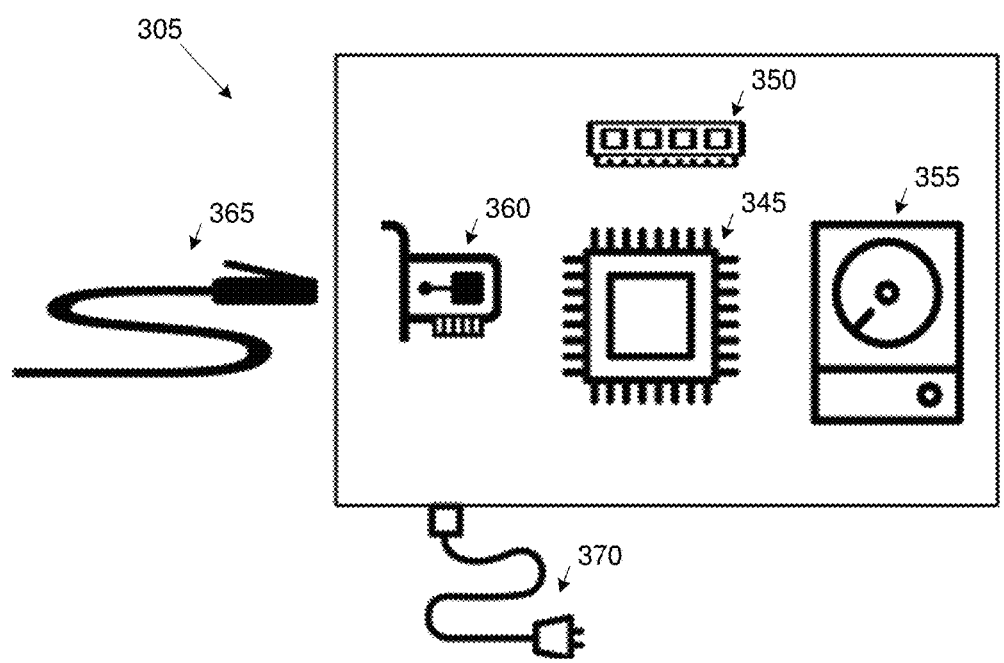
FIG. 2 is a schematic illustration of at least some exemplary embodiments of the present disclosure.

Computing device 305 may include components similar to as described below regarding FIG. 10. In at least some exemplary embodiments and as illustrated in FIG. 2, computing device 305 may include a central processing unit (CPU) 345. Central processing unit 345 may include electronic circuitry disposed inside of computing device 305 that may carry out the instructions of a computer program by performing basic arithmetic, logical, control, and input/output (I/O) operations specified by the instructions. Central processing unit 345 may execute compiled binary code instructions to complete actions.

Computing device 305 may also include a random access memory (RAM) 350 that may be a computer data storage. Random access memory 350 may allow data items to be read or written in about (e.g., almost) the same amount of time irrespective of the physical location of data inside the memory. Random access memory 350 may be used to store, retrieve, and/or swap the binary code as controlled by central processing unit 345.

Computing device 305 may further include a hard disk drive (HDD) 355. Hard disk drive 355 may be a hard disk, a hard drive, and/or a fixed disk. Hard disk drive 355 may be a data storage device used for storing and retrieving digital information. Hard disk drive 355 may be used to store some or substantially all compiled binary code that may be swapped into random access memory 350 as controlled by central processing unit 345.

Computing device 305 may also include a network interface card (NIC) 360. Network interface card 360 may be a computer hardware component that may connect computing device 305 to a computer network (e.g., network component 315). System 300 may be an internet-based system and network interface card 360 may transmit data back and forth between computing device 305 and user devices 320, 325, and/or 330, which users may use to access data of system 300.

Computing device 305 may further include an electrical connector 365. Electrical connector 365 may be any suitable cord, cable, or wire for carrying electrical signals. Electrical connector 365 may be a twisted pair cable. In at least some exemplary embodiments, electrical connector 365 may be a category 5 (Cat 5) cable. One or more electrical connectors 365 may connect computing device 305 with other components of system 300 such as router 310 and sensor assembly 340. One or more electrical connectors 365 may also connect any other suitable components of system 300 such as, for example, user devices 320, 325, and 330 and network component 315. In addition to or as an alternative to electrical connectors 365, the exemplary disclosed components of system 300 may communicate via one or more wireless networks. In at least some exemplary embodiments, some or substantially all data transfer may occur via radio waves.

Computing device 305 may also include a power connector 370. Power connector 370 may be any suitable cord, cable, or wire for transferring electrical current. Power connector 370 may connect computing device 305 to a power storage (e.g., via a wall socket and/or extension cord). Power connector 370 may include a power supply of computing device 305 that powers (e.g., via being connected to a power storage as described above) an operation of the exemplary disclosed components of computing device 305. For example, power connector 370 may include a power supply unit (PSU) that provides power for powering the internal components of computing device 305.

Returning to FIG. 1, router 310 may be any suitable network router. Router 310 may be similar to router 202 described below regarding FIG. 11. Router 310 may move data between computer networks (e.g., network component 315) and/or computing devices (e.g., computing device 305). Router 310 may for example direct data traffic on network component 315 (e.g., the Internet). Data packets may be forwarded between a plurality of routers (e.g., including router 310) through the internet until reaching a destination node. Router 310 may thereby transfer data between the exemplary disclosed components of system 300 (e.g., between computing device 305 and user devices 320, 325, and/or 330).

Network component 315 may be a WAN such as, for example, the Internet. Network component 315 and/or other components of system 300 (e.g., computing device 305, sensor assembly 340, and/or user devices 320, 325, and 330 may communicate with each other via any suitable communication method such as, for example, wireless communication (e.g., CDMA, GSM, 3G, 4G, and/or 5G), direct communication (e.g., wire communication such as electrical connector 365), Bluetooth communication coverage, Near Field Communication (e.g., NFC contactless communication such as NFC contactless methods), radio frequency communication (e.g., RF communication such as short-wavelength radio waves, e.g., UHF waves), and/or any other desired communication technique. Network component 315 may include a system (e.g., a global system) of interconnected computer networks (e.g., the Internet). System 300 may adhere to the Internet protocol suite (TCP/IP) used to link worldwide and accomplish some or substantially all of the exemplary disclosed functionality of system 300.

User devices 320, 325, and/or 330 may be any suitable user device for receiving input and/or providing output (e.g., raw data or other desired information) to a user of system 300. User devices 320, 325, and/or 330 may be, for example, a touchscreen device (e.g., a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, a dedicated user device or interface designed to work specifically with other components of system 300, and/or any other suitable user device or interface. For example, user devices 320, 325, and/or 330 may include a touchscreen device of a smartphone or handheld tablet. For example, user devices 320, 325, and/or 330 may include a display that may include a graphical user interface to facilitate entry of input by a user and/or receiving output. For example, system 300 may provide notifications to a user via output transmitted to user devices 320, 325, and/or 330 (e.g., and/or other components of system 300 such as computing device 305 and/or sensor assembly 340). User devices 320, 325, and/or 330 may also be any suitable accessory such as a smart watch, Bluetooth headphones, and/or other suitable devices that may communicate with components of system 300.

Figure 3:
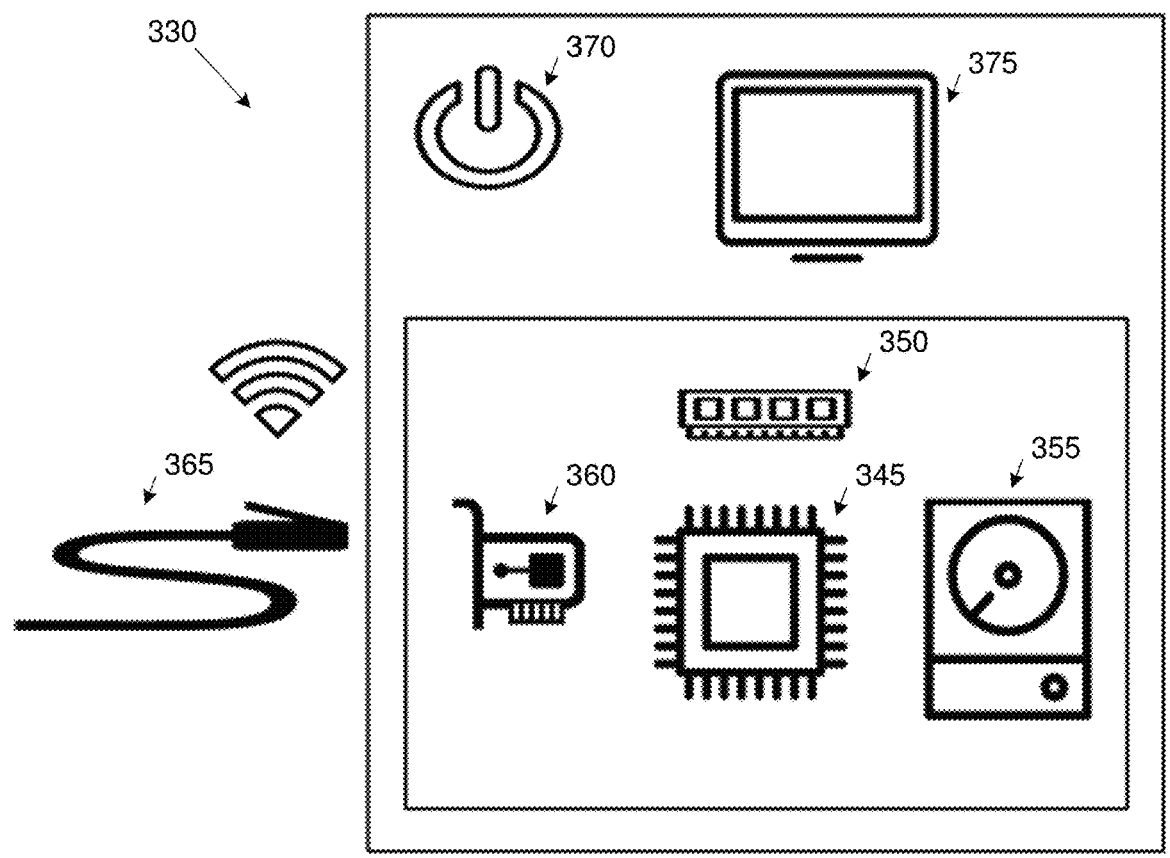
FIG. 3 is a schematic illustration of at least some exemplary embodiments of the present disclosure.

FIG. 3 illustrates an exemplary embodiment of user device 330. User device 330 may include a central processing unit (CPU) 345, a random access memory (RAM) 350, a hard disk drive (HDD) 355, and a network interface card (NIC) 360 similar to as described above regarding computing device 305. User device 330 may also include an electrical connector 365 and a power connector 370 similar to as described above regarding computing device 305. User device 330 may also communicate wirelessly similar to for example as described above. User device 330 may also include a display 375. Display 375 may convert digital signals into a visual display. System 300 may display pertinent information to users via display 375. A user may also utilize display 375 or any other suitable user interface of the exemplary disclosed user interface to provide input data that is transferred to computing device 305.

Figure 4:
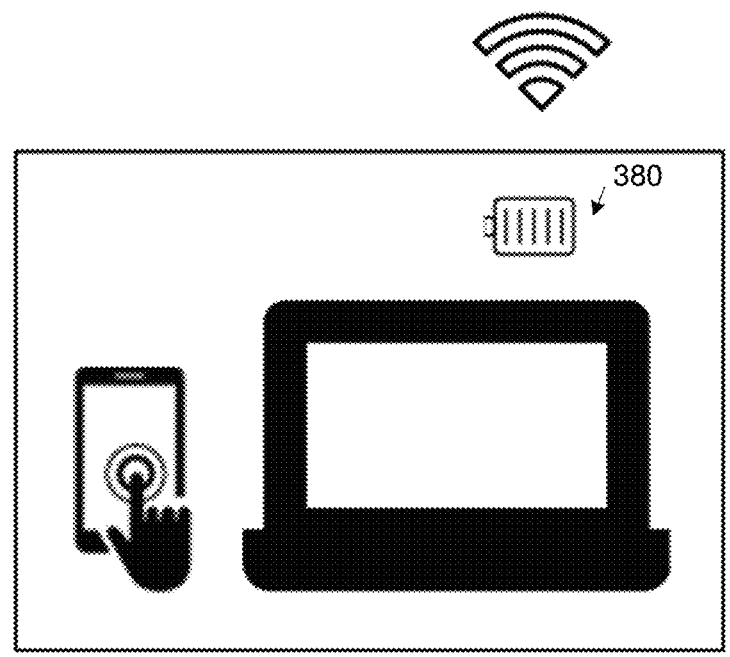
FIG. 4 is a schematic illustration of at least some exemplary embodiments of the present disclosure.

FIG. 4 illustrates an exemplary embodiment of user devices 320 and 325. User devices 320 and 325 may for example include a battery 380 that powers the exemplary disclosed user device. User devices 320 and 325 may communicate wirelessly for example as described above.

Figure 5:
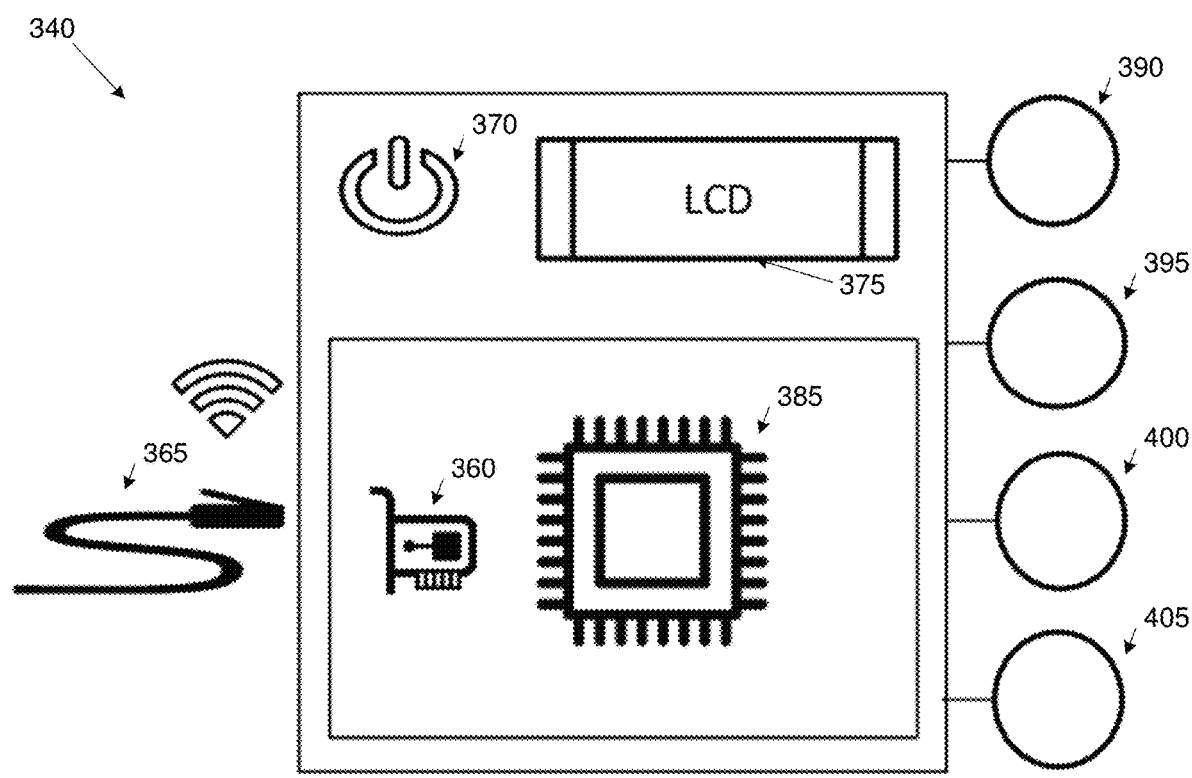
FIG. 5 is a schematic illustration of at least some exemplary embodiments of the present disclosure.

FIG. 5 illustrates an exemplary embodiment of sensor assembly 340. Sensor assembly 340 may be a weather station. Sensor assembly 340 may be configured to sense data of environmental conditions (e.g., including atmospheric conditions). Sensor assembly 340 may include any suitable sensors and equipment for measuring atmospheric conditions such as temperature, humidity, dew point, altitude, wind direction, wind speed, and/or any other desired conditions.

Sensor assembly 340 may include a network interface card (NIC) 360, an electrical connector 365 (e.g., and/or wireless communication components), and a power connector 370 similar to as described above regarding computing device 305. Sensor assembly 340 may also include a display 375 similar to as described above regarding computing device 305. Display 375 may be a flat panel electronic device used to display information to a user. In at least some exemplary embodiments, display 375 may be an LCD display.

Sensor assembly 340 may include a controller 385. Controller 385 may control an operation of sensor assembly 340. Controller 385 may include for example a micro-processing logic control device or board components. Also for example, controller 385 may include input/output arrangements that allow it to be connected (e.g., via wireless and/or electrical connection) to other components of system 300. Controller 385 may communicate with other components of system 300 by any suitable communication technique for example as described above. In at least some exemplary embodiments, system 300 may be a microcontroller (MCU) chip that may include and process some or substantially all storage and instructions for executing analog values from sensors of sensor assembly 340 into digital data.

Sensor assembly 340 may include a plurality of sensors for sensing and collecting data associated with ambient and environmental conditions at or in the vicinity of sensor assembly 340 and/or other components of system 300. Sensor assembly 340 may include sensors for sensing any desired condition such as, for example, a temperature sensor 390, a humidity sensor 395, a wind sensor 400, and a location sensor 405. Sensor assembly 340 may also include a barometric pressure sensor or any other desired sensor.

Temperature sensor 390 may be any suitable sensor for measuring a temperature of a surrounding environment of sensor assembly 340 and other components of system 300. Temperature sensor 390 may convert an analog input into digital data. Temperature sensor 390 may include any suitable sensing components such as, for example, a thermocouple, a resistance temperature detector (RTD), a thermistor, and/or a semiconductor-based temperature sensing component.

Humidity sensor 395 may be any suitable sensor for detecting and sensing a humidity (e.g., relative humidity) at or near a location of sensor assembly 340. In at least some exemplary embodiments, humidity sensor 395 may include a hygrometer or any other suitable device for sensing a humidity (e.g., relative humidity). For example, humidity sensor 395 may include capacitive, thermal, acoustic, optical, photonic, and/or resistive sensing components. Humidity sensor 395 may include a capacitive relative humidity sensor, a resistive humidity sensor, and/or a thermal conductivity humidity sensor. Humidity sensor 395 may measure a dew point and a humidity of a surrounding environment of sensor assembly 340 and convert analog input into digital data.

Wind sensor 400 may be any suitable sensor for measuring wind speed, wind direction, and any other desired wind characteristics. Wind sensor 400 may include a wind vane and/or an anemometer. For example, wind sensor 400 may include a propeller anemometer or a cup anemometer. Wind sensor 400 may convert analog input from a wind vane and/or the anemometer and convert the input into digital data providing wind speed and wind direction information. Wind sensor 400 may also include a sonic wind sensor such as a sodar sensor utilizing sonic detection and ranging. Wind sensor 400 may also include a lidar sensor utilizing light detection and ranging.

Location sensor 405 may be any suitable sensor for measuring a geographic location such as, for example, a global navigation satellite system sensor (e.g., a geo-positioning sensor or GPS sensor). For example, location sensor 405 may be a global positioning system sensor, or any other suitable type of sensor for sensing location with suitable accuracy. For example, location sensor 405 may provide a precise location of sensor assembly 340 of within about 10 feet, within about 5 feet, within about 3 feet, and/or within about 1 foot. Location sensor 405 may include a receiver and antenna that provides a device location by using any suitable satellite navigation system.

In at least some exemplary embodiments, system 300 may provide first responders and emergency personnel with real-time geographic and situational information on-site at an emergency situation such as a fire incident. System 300 may utilize a cellular connection, an internet connection, or any other suitable communication technique for example as described herein to provide first responders and emergency personnel with access (e.g., instant access) to information pertaining to an emergency incident such as a fire incident. System 300 may enhance a capability of first responders and emergency personnel to quickly detect, analyze, and share response activities and tasks in real-time and/or near real-time.

Figure 6:
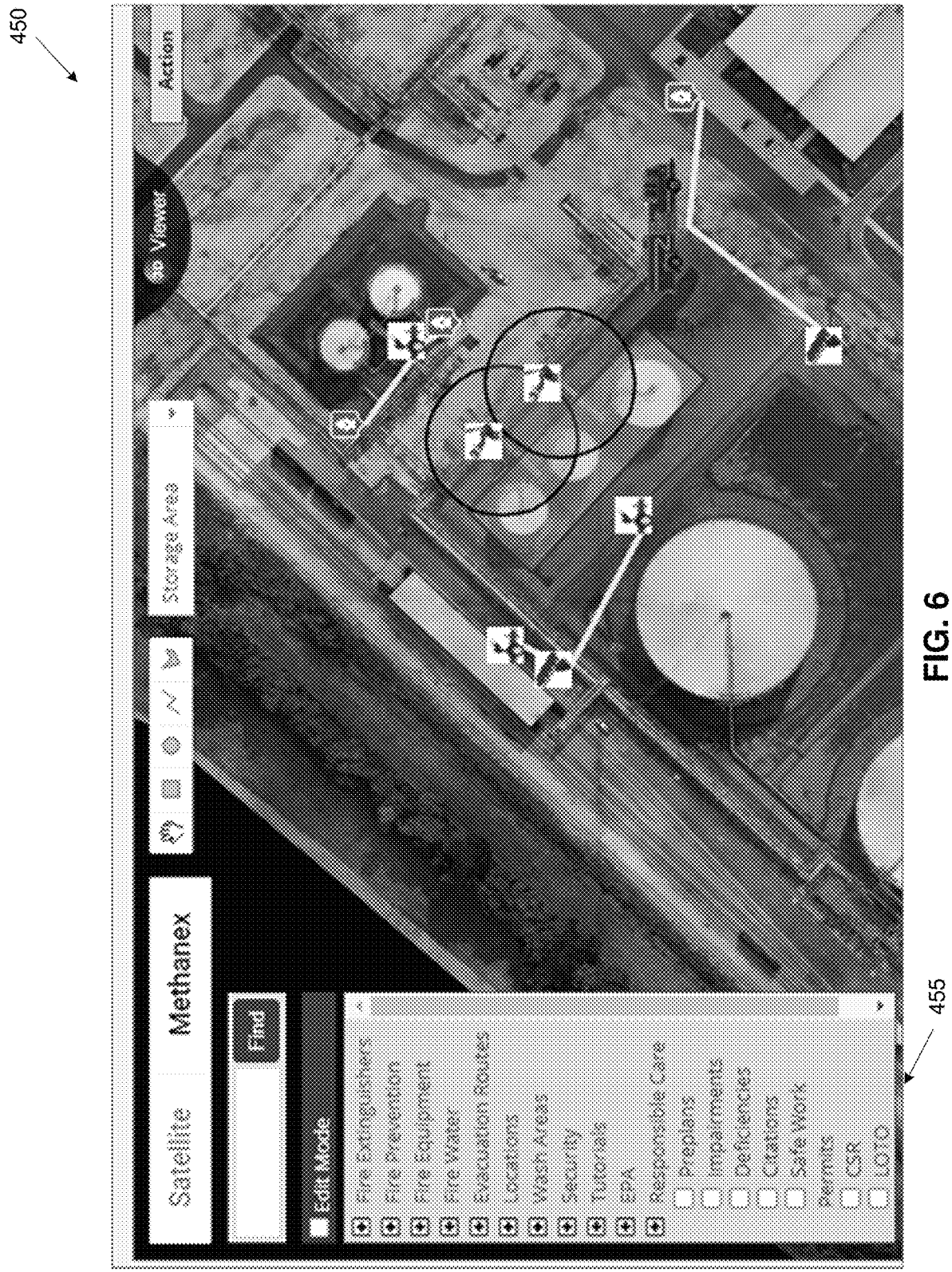
FIG. 6 is a display illustration of at least some exemplary embodiments of the present disclosure.

As illustrated in FIG. 6, system 300 may provide a graphical user interface 450 to a user. Graphical user interface 450 may be displayed to a user by any suitable device such as, for example, a display of user device 320, 325, and/or 330 (e.g., display 375) and/or a display of any other suitable device of system 300 such as, for example, computing device 305 and/or sensor assembly 340. Graphical user interface 450 may use any suitable mapping system as a baseline map to provide map data for example as illustrated in FIG. 6. In at least some exemplary embodiments, system 300 may use the WGS 84 geographic coordinate system (e.g., which may have an error of less than 2 centimeters). System 300 may use any mapping coordinate system having suitable cartography, geodesy, and/or compatibility for global navigation (e.g., GPS). For example, system 300 may use Google Maps as a baseline map, which may cover all of North America down to the street level details and/or any other desired region of the world. System 300 may allow users to manipulate graphical user interface 450 to select from street line views, satellite views, and/or hybrid views (e.g., satellite with street overlay) views, which may provide desired presentation, map resolution, and visual details and information to users such as emergency personnel and first responders. Graphical user interface 450 may display any desired graphical elements 455 to a user. Graphical elements 455 may include toggles to selectively display map features such as, for example, firefighting equipment (e.g., fire hydrants, fire extinguishers, hoses, valves, and any other suitable equipment), evacuation routes, map view types, infrastructure features (e.g., storage areas such as water and emergency equipment), and/or any other desired feature controls.

As illustrated in FIG. 6, system 300 (e.g., graphical user interface 450) may provide a user with a capability to load predetermined data such as pre-plans for a given location, training scenarios, or any other suitable type of data. For example, the user may select one or more desired layers of information that may provide data that may be customized or appropriate for a given type of user (e.g., for emergency personnel, first responders, firefighters, an agency at a given level of government, or any other organization, agency, or individual). System 300 (e.g., graphical user interface 450) may load predetermined data to display on a map for a given user (e.g., a monitor of interest on the map).

Figures 7A, 7B:
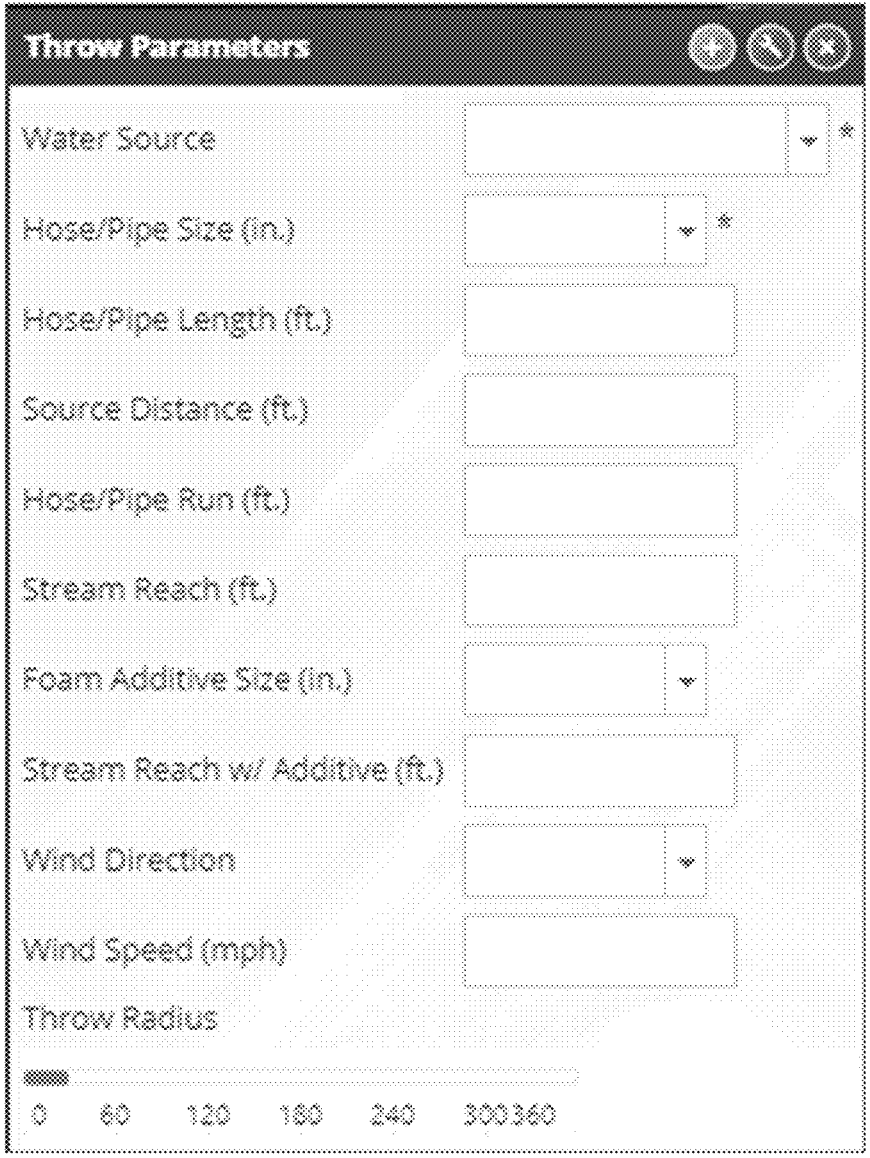
FIG. 7A is a display illustration of at least some exemplary embodiments of the present disclosure.
FIG. 7B is a display illustration of at least some exemplary embodiments of the present disclosure.

As illustrated in FIG. 7A, system 300 may provide a graphical user interface 460 to a user. Graphical user interface 460 may be displayed to a user by any suitable device such as, for example, a display of user device 320, 325, and/or 330 (e.g., display 375) and/or a display of any other suitable device of system 300 such as, for example, computing device 305 and/or sensor assembly 340. Graphical user interface 460 may prompt a user to enter desired parameters. For example, graphical user interface 460 may prompt a user to enter fluid throw parameters. The fluid throw parameters may be parameters for how any suitable fluid such as fire-suppressing fluid (e.g., water, water including additives, fluorocarbons, foam, and/or any other suitable combination of these fluids or any other suitable fluid) may be thrown (e.g., projected, propelled, ejected, transferred, or moved). As illustrated in FIG. 7A, a user may enter any suitable parameter data into system 300 using graphical user interface 460 such as, for example, a water source (e.g., a reservoir, tank, or system), a hose or pipe size (e.g., in inches, centimeters, or any other suitable unit), a hose or pipe length (e.g., in feet, meters, or any other suitable unit), a source distance (e.g., in feet, meters, or any other suitable unit), a hose or pipe run (e.g., a length of hose or pipe actually used to supply fluid at a source location in feet, meters, or any other suitable unit), a stream or throw reach (e.g. in feet, meters, or any other suitable unit), a stream or throw reach with additives (e.g. in feet, meters, or any other suitable unit), a foam additive size (e.g., in inches, centimeters, or any other suitable unit), a throw radius (e.g. in feet, meters, or any other suitable unit), and/or any other desired parameters. At least some of the parameter data may be associated with equipment such as fluid projection systems (e.g., fire hoses) that create the exemplary disclosed fluid throw (e.g., a cone, circle, ellipse, or other shape of fluid such as water) that is projected or thrown by the equipment (e.g., emergency equipment such as pressurized pumps, hoses, tanks, water lines, valves, and/or other suitable infrastructure and equipment).

System 300 may also display to a user or prompt a user for any other desired parameters to input, for example as illustrated in FIG. 7B. The parameter data may include environmental (e.g., ambient) conditions near components of system 300. Some of the parameter data may include sensor data that may be sensed and provided by sensor assembly 340. As illustrated in FIG. 7B, any suitable parameter data may be displayed by system 300 using a graphical user interface 470 such as, for example, a temperature, a humidity, a wind direction, a wind speed, a nozzle change, a location, weather conditions, and/or any other desired parameters. Any of the parameter data illustrated in FIGS. 7A and 7B may be entered by a user, sensed and provided by sensor assembly 340, and/or provided from hard disk drive 355 and/or random access memory 350 of computing device 305.

Figure 8:
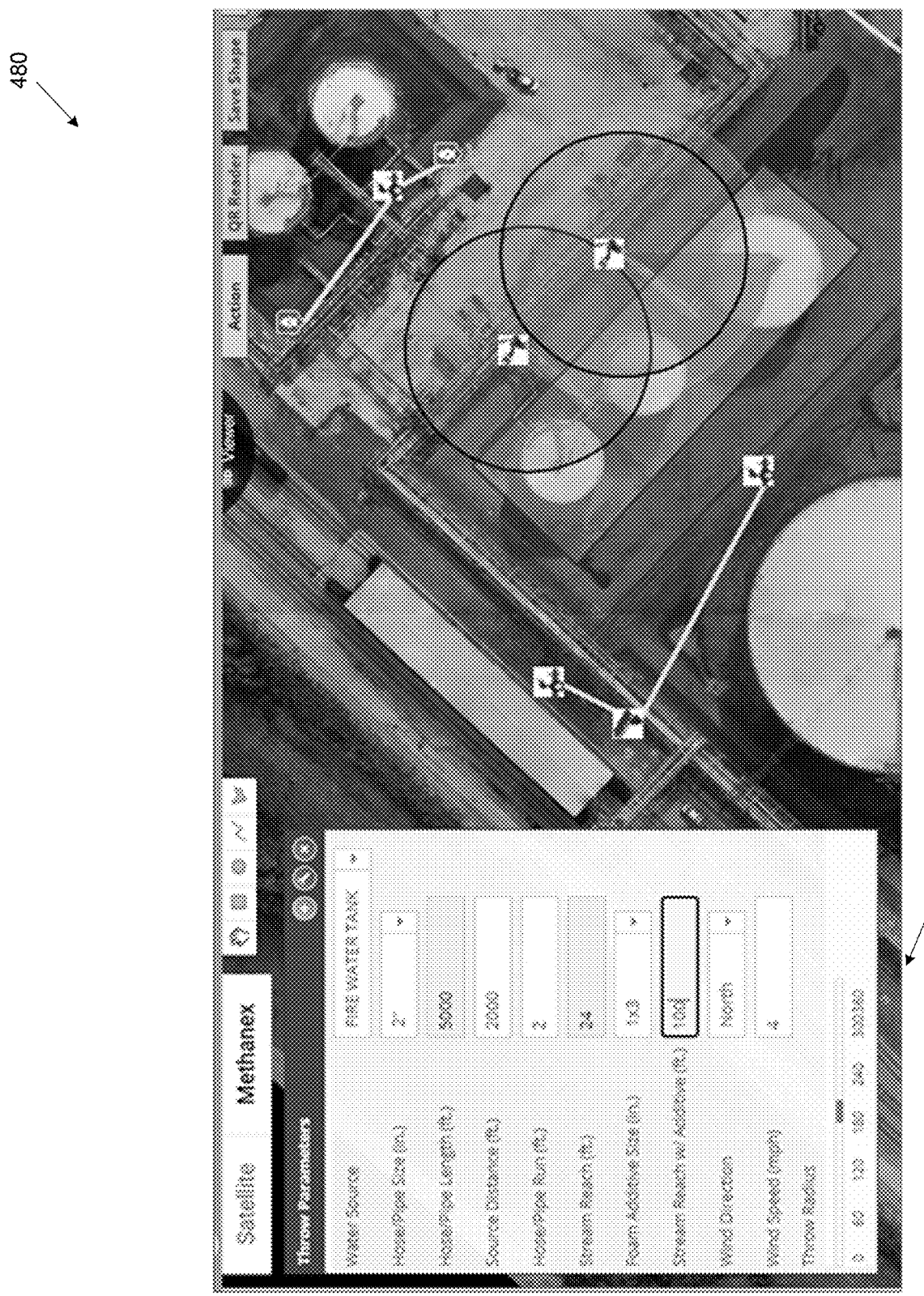
FIG. 8 is a display illustration of at least some exemplary embodiments of the present disclosure.

As illustrated in FIG. 8, system 300 may provide a graphical user interface 480 to a user. Graphical user interface 480 may be displayed to a user by any suitable device such as, for example, a display of user device 320, 325, and/or 330 (e.g., display 375) and/or a display of any other suitable device of system 300 such as, for example, computing device 305 and/or sensor assembly 340. Graphical user interface 480 may depict how a fluid (e.g., water, water including additives, fluorocarbons, foam, and/or any other suitable combination of these fluids or any other suitable fluid) may be thrown (e.g., projected, propelled, ejected, transferred, or moved) based for example on predetermined data, data input by a user (e.g., as described above regarding FIGS. 7A and 7B), predetermined algorithms, machine learning operations, and/or any other suitable criteria. For example as illustrated in FIG. 8, a fluid throw shape may be depicted based on input criteria provided by the user for example as described above regarding FIGS. 7A and 7B and one or more predetermined fluid throw coefficients (e.g., stored in hard disk drive 355 of computing device 305). For example, system 300 may calculate (e.g., via an operation of central processing unit 345) and graphical user interface 480 may depict (e.g., visualize) a fluid throw such as a throw reach ring or a directional throw cone. Also as illustrated in FIG. 8, a user may enter input via one or more graphical elements 485 to change (e.g., adjust) any suitable throw parameters such as the throw parameters described above regarding FIG. 7A. For example, the user may change a water source, a hose or pipe size, a hose or pipe length, a source distance, a hose or pipe run, a stream or throw reach, a stream or throw reach with additive, a foam additive size, a throw radius, and/or any other suitable parameters, which may change one or more fluid throws illustrated by graphical user interface 480. A user may thereby change (e.g. adjust) parameters to visualize changes to fluid throws in real-time and/or near real-time (e.g., visualize changes within seconds). The exemplary disclosed fluid throw may be a circle, ellipse, cone, or any other suitable shape in which fluid such as water, water including additives, fire-suppressing fluids such as fluorocarbons, foam, and/or any other suitable combination of these fluids or any other suitable fluid may be thrown (e.g., projected, propelled, ejected, transferred, or moved) for example to extinguish or control a fire or other emergency condition. The user may thereby use system 300 to adjust and visualize throw reach effectiveness and/or reach in real-time and/or near real-time based on changing throw parameters as illustrated in FIG. 8. Computing device 305 and/or user devices 320, 325, and/or 330 may provide for printing, saving, and/or emailing of illustrations such as screenshots of throw range rings, directional throw based on wind direction and speed, and/or manual direction. System 300 may distribute the information in real-time and/or near real-time via the exemplary disclosed communication techniques described above. System 300 may thereby provide for building a collection of data (e.g., including screenshots of graphical user interface 480 and/or any other suitable data) for use in planning (e.g., pre-planning for emergency incidents) and/or training.

The exemplary disclosed system and method may be used in any suitable application for responding to, controlling, and/or eliminating an emergency situation. For example, the exemplary disclosed system and method may be used in any suitable application for fire incident mitigation. The exemplary disclosed system and method may be used in any suitable application for responding to a fire, fighting a fire, or eliminating a fire.

Figure 9:
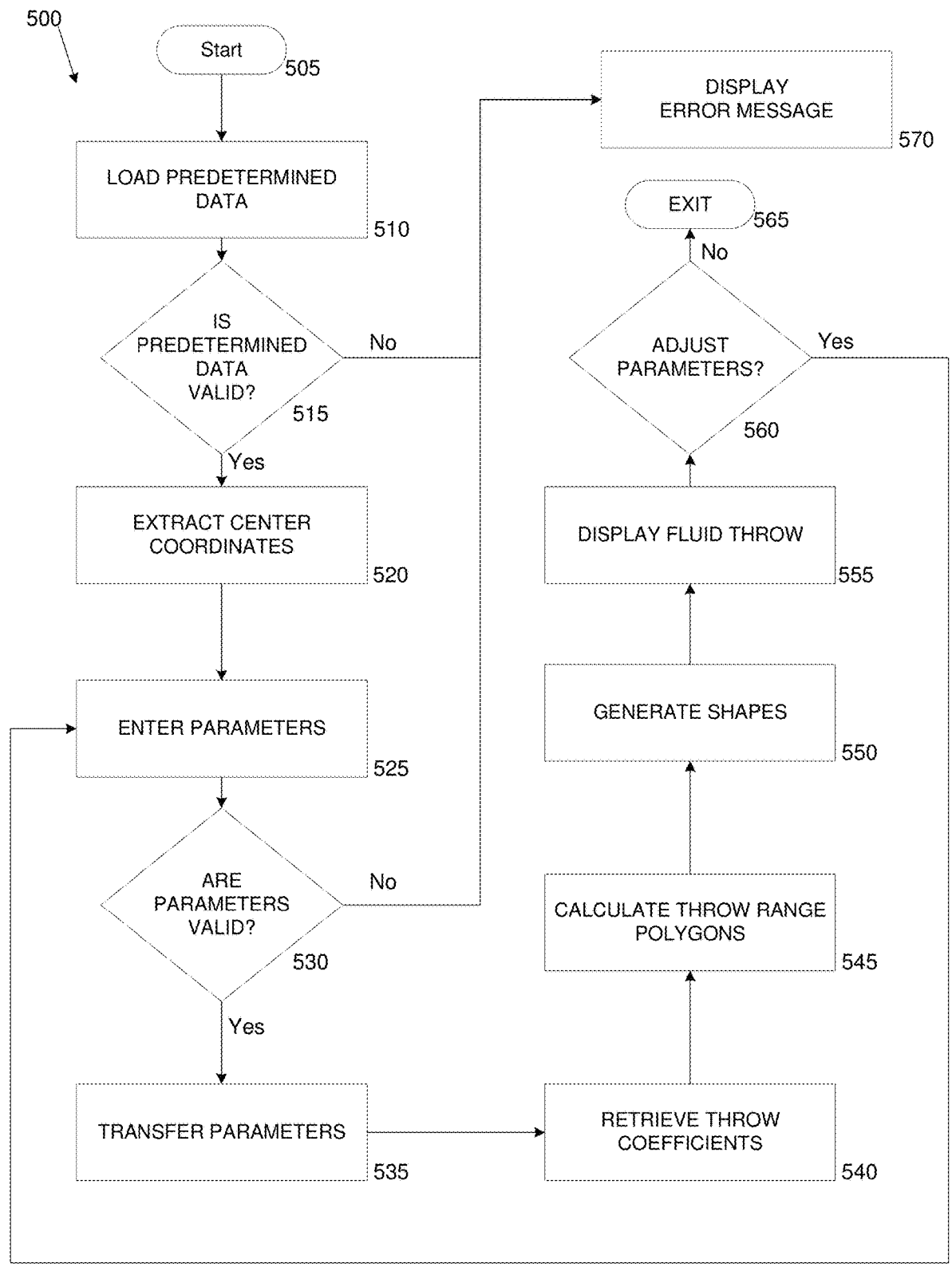
FIG. 9 illustrates an exemplary process of at least some exemplary embodiments of the present disclosure.

FIG. 9 illustrates an exemplary operation of the exemplary disclosed system. Process 500 begins at step 505. Process 500 may be for example a fluid throw effectiveness analysis process. At step 510, system 300 may load predetermined data. System 300 may load data based on previously prepared pre-planning scenarios for example as described above. At step 515, system 300 may verify whether or not the predetermined data loaded at step 510 is valid, correct, formatted correctly, and/or up-to-date. If system 300 determines that the predetermined data is invalid, incorrect, incorrectly formatted, and/or outdated, system 300 may display an error message at step 570 via any suitable user interface of system 300 such as displays of user devices 320, 325, and 330, computing device 305, and/or any other suitable component of system 300. If system 300 determines that the predetermined data is valid, correct, formatted correctly, and/or up-to-date, system 300 may proceed to step 520.

At step 520, system 300 may extract center coordinates based on for example predetermined data, a user identification (e.g., based on a user being a given agency, level of government, or role such as a firefighting organization), user input, and/or any other suitable criteria. In at least some exemplary embodiments, system 300 may extract a selected monitor (e.g., monitor of interest) center coordinates that may correspond to a desired geographic location, map scale, resolution, and/or any other desired criteria.

At step 525, system 300 may receive parameter input data such as fluid throw parameter data. One or more users may input fluid throw parameter data for example as described above regarding FIGS. 7A and 7B. At step 530, system 300 may verify whether or not the parameter data entered at step 525 is valid, correct, formatted correctly, and/or up-to-date. If system 300 determines that the parameter data is invalid, incorrect, incorrectly formatted, and/or outdated, system 300 may display an error message at step 570 via any suitable user interface of system 300 such as displays of user devices 320, 325, and 330, computing device 305, and/or any other suitable component of system 300. If system 300 determines that the predetermined data is valid, correct, formatted correctly, and/or up-to-date, system 300 may proceed to step 535.

At step 535, system 300 may transfer parameter data. For example, system 300 may transfer validated parameter data from user devices 320, 325, and/or 330 to computing device 305 via network component 315 and/or transfer data within computing device 305. System 300 may also transfer sensed data from sensor assembly 340 to computing device 305. The validated parameter data and sensed data may be utilized by computing device 305 in fluid throw range calculations for example as described herein.

At step 540, system 300 may retrieve throw coefficients that may include predetermined data and information (e.g., data, equations, algorithms, and/or relationships describing how fluid is physically projected, propelled, ejected, transferred, or moved) that may be used in the exemplary disclosed calculations. Data such as throw coefficients, sensed data, and/or parameter data may be retrieved from hard disk drive 355 for use in calculations performed by central processing unit 345.

At step 545, system 300 (e.g., central processing unit 345) may generate throw range polygon data. For example, central processing unit 345 may calculate location data (e.g., spatial coordinates) for defining throw range or reach based for example on sensed data, throw coefficients, and/or parameter data.

At step 550, system 300 may generate shape data based on the polygon data determined at step 545. For example, system 300 (e.g., central processing unit 345) may generate shape data for directional fluid throw based on wind direction, wind speed, and/or any other suitable data for example as described herein.

At step 555, system 300 may display a fluid throw (e.g., a fluid throw outcome) on any suitable display of system 300 such as a display of user devices 320, 325, and/or 330 (e.g., and/or computing device 305 and/or sensor assembly 340) for example as illustrated in FIG. 8.

At step 560, a user may decide to change (e.g., revise) input data for example as illustrated in FIG. 8. For example, the user may decide to change parameter input to revise fluid throw shapes and ranges in real-time and/or near real-time for example as described herein. If the user decides to change input data such as parameter data, system 300 returns to step 525 and repeats steps 530 through 555 to revise and display new fluid throws in real-time and/or near real-time. System 300 may also return to step 525 and repeat steps 525 through 555 based on predetermined criteria or any other suitable criteria. System 300 may return to step 525 to allow a user to enter updated parameter data and then repeat steps 530 through 555 for as many iterations as desired. A user may thereby visualize new and changed fluid throws as much as desired based on adjusting parameter inputs at step 525. When a user is finished changing parameter inputs, process 500 ends at step 565.

In at least some exemplary embodiments, the exemplary disclosed system and method may track the performance and outcome of inspections (e.g., feature inspections) of equipment such as fire hydrants, fire extinguishers, hoses, and valves having locations and status information that may be stored in system 300. For example, inspections may be logged within the system and viewed in real-time and/or near real-time as the inspections are performed. Such inspections recorded and tracked in real-time and/or near real-time may boost confidence in a reliability and accuracy of the inspection outcome and equipment readiness. The exemplary disclosed system and method may maintain data including update history for some or substantially all equipment and features, which may facilitate record-keeping and safety audits. Also for example, the exemplary disclosed system and method may track and record employee certification and training activities. The exemplary disclosed system and method may track and record maintenance history for some or substantially all mobile equipment, which may integrate data of day-to-day activities of an organization into response preparedness tracking and planning.

In at least some exemplary embodiments, the exemplary disclosed system and method may be used by first responders and emergency personnel for real-time and/or near real-time geographical and situational details on-site at a location of an emergency. The exemplary disclosed system and method may utilize cellular or internet connection and/or any other suitable communication technique to provide access (e.g., instant access) to information pertaining to an emergency incident. The exemplary disclosed system and method may enhance a capability of first responders and emergency personnel to quickly detect, analyze, and/or share fluid throw effectiveness in real-time and/or near real-time. The exemplary disclosed system and method may provide for printing, saving, storing, and/or transferring (e.g., emailing) of some or substantially all recorded fluid throw scenarios to selected system users and/or personnel external to the system. The exemplary disclosed system and method may have suitable features (e.g., a substantially full suite of features) that provides data for a safety audit in real-time and/or near real-time. The exemplary disclosed system and method may include maintenance features (e.g., built-in entity maintenance features) that may aid in providing up-to-date, accurate information to users based on the exemplary disclosed parameters for example as described herein.

In at least some exemplary embodiments, the exemplary disclosed system and method may visualize some or substantially all data pertinent to a given pre-planning incident such as a fire emergency scenario. The exemplary disclosed system and method may provide virtually real-time and/or near real-time information as an emergency situation changes. The exemplary disclosed system and method may also provide instant fire mitigation effectiveness based on fluid type and equipment (e.g., firefighting equipment) used. The exemplary disclosed system and method may further provide easy access for users to a collection of scenarios for training and pre-planning for responding to fire incidents (e.g., types of probable or expected emergencies).

In at least some exemplary embodiments, the exemplary disclosed emergency incident system may include an emergency incident module, comprising computer-executable code stored in non-volatile memory, a computing device (e.g., computing device 305), a sensor assembly (e.g., sensor assembly 340), and one or more user devices (e.g., user devices 320, 325, and/or 330). The emergency incident module, the computing device, the sensor assembly, and the one or more user devices may be configured to sense data of environmental conditions, receive input of a first parameter data from one or more users, determine at least one fluid throw based on the sensed data and the first parameter data, display the at least one fluid throw to the one or more users, receive input of a second parameter data from the one or more users, and update the at least one fluid throw based on the sensed data and the second parameter data. The emergency incident module, the computing device, the sensor assembly, and the one or more user devices may be further configured to display the updated at least one fluid throw to the one or more users. Determining the at least one fluid throw may include calculating location coordinates based on the sensed data and the first parameter data. Displaying the at least one fluid throw to the one or more users may include displaying a shape defined by the location coordinates on a map. The at least one fluid throw may be a geographic area covered by fire-suppressing fluid. The sensor assembly may include at least one selected from the group of a temperature sensor, a humidity sensor, a wind sensor, a location sensor, and combinations thereof. Each of the first parameter data and the second parameter data may include at least one selected from the group of a water source, a hose or pipe size, a hose or pipe length, a source distance, a hose or pipe run, a stream or throw reach, a stream or throw reach with additive, a foam additive size, a throw radius, and combinations thereof. Updating the at least one fluid throw based on the sensed data and the second parameter data may occur in real-time or near real-time. The sensed data may include at least one selected from the group of a temperature data, a humidity data, a wind speed data, a wind direction data, a location data, and combinations thereof.

In at least some exemplary embodiments, the exemplary disclosed method may include sensing data of environmental conditions using a sensor assembly (e.g., sensor assembly 340), receiving input of a first parameter data from one or more users, determining at least one first fluid throw based on the sensed data and the first parameter data using a computing device (e.g., computing device 305), and displaying the at least one first fluid throw to the one or more users via one or more user devices (e.g., user devices 320, 325, and/or 330). The exemplary disclosed method may also include receiving input of a second parameter data from the one or more users, determining at least one second fluid throw based on the sensed data and the second parameter data using a computing device, and displaying the at least one second fluid throw to the one or more users via the one or more user devices. Each of the first parameter data and the second parameter data may include at least one selected from the group of a water source, a hose or pipe size, a hose or pipe length, a source distance, a hose or pipe run, a stream or throw reach, a stream or throw reach with additive, a foam additive size, a throw radius, and combinations thereof. The sensed data may include at least one selected from the group of a temperature data, a humidity data, a wind speed data, a wind direction data, a location data, and combinations thereof. The exemplary disclosed method may include updating the sensed data in real-time by transferring update sensed data from the sensor assembly to the computing device. Displaying the at least one fluid throw to the one or more users may include displaying a shape defined by a plurality of location coordinates, which are determined based on the sensed data and the first parameter data, on a map. The at least one first fluid throw and the at least one second fluid throw may each depict a geographic area on the map covered by a fluid including at least one selected from the group of water, water including additives, fluorocarbon material, foam, and combinations thereof.

In at least some exemplary embodiments, the exemplary disclosed fire incident system may include a fire incident module, comprising computer-executable code stored in non-volatile memory, a computing device (e.g., computing device 305), a sensor assembly (e.g., sensor assembly 340), and one or more user devices (e.g., user devices 320, 325, and/or 330). The fire incident module, the computing device, the sensor assembly, and the one or more user devices may be configured to sense data of environmental conditions, receive input of a first parameter data from one or more users, determine at least one first fire-suppressing fluid throw based on the sensed data and the first parameter data, and display the at least one first fire-suppressing fluid throw to the one or more users. The fire incident module, the computing device, the sensor assembly, and the one or more user devices may also be configured to receive input of a second parameter data from the one or more users, determine at least one second fire-suppressing fluid throw based on the sensed data and the second parameter data using a computing device, display the at least one second fire-suppressing fluid throw to the one or more users via the one or more user devices, and update the sensed data in real-time. Displaying the at least one first fire-suppressing fluid throw and the at least one second fire-suppressing fluid throw to the one or more users may include displaying a shape defined by a plurality of location coordinates, which are determined based on the sensed data and the first parameter data, on a map. The at least one first fire-suppressing fluid throw and the at least one second fire-suppressing fluid throw may each depict a geographic area on the map covered by a fluid including at least one selected from the group of water, water including additives, fluorocarbon material, foam, and combinations thereof. Each of the first parameter data and the second parameter data may include at least one selected from the group of a water source, a hose or pipe size, a hose or pipe length, a source distance, a hose or pipe run, a stream or throw reach, a stream or throw reach with additive, a foam additive size, a throw radius, and combinations thereof. The sensed data may include at least one selected from the group of a temperature data, a humidity data, a wind speed data, a wind direction data, a location data, and combinations thereof.

The exemplary disclosed system and method may provide an efficient and effective technique for fire incident mitigation. The exemplary disclosed system and method may provide real-time and/or near real-time data and information access, including accurate location information, for use in fire incident mitigation. The exemplary disclosed system and method may also provide real-time and/or near real-time atmospheric data for integration with a throw calculation algorithm to provide for accurate fluid dispersion. The exemplary disclosed system and method may further provide a plurality of layers of information, which may help various agencies (e.g., public health and safety agencies) to identify and analyze data relevant to a given agency as well as obtaining overall aggregate information (e.g., to provide a full picture of a fire incident). The exemplary disclosed system and method may also provide for adjustment (e.g., virtual adjustment) of fluid throw parameters to visualize various scenarios. The exemplary disclosed system and method may further provide a single system for maintaining some or substantially all datasets used in emergency response activities. The exemplary disclosed system and method may also record actual and/or virtual scenarios for use in effective training of personnel and/or planning (e.g., creating pre-plans).

Figure 10:
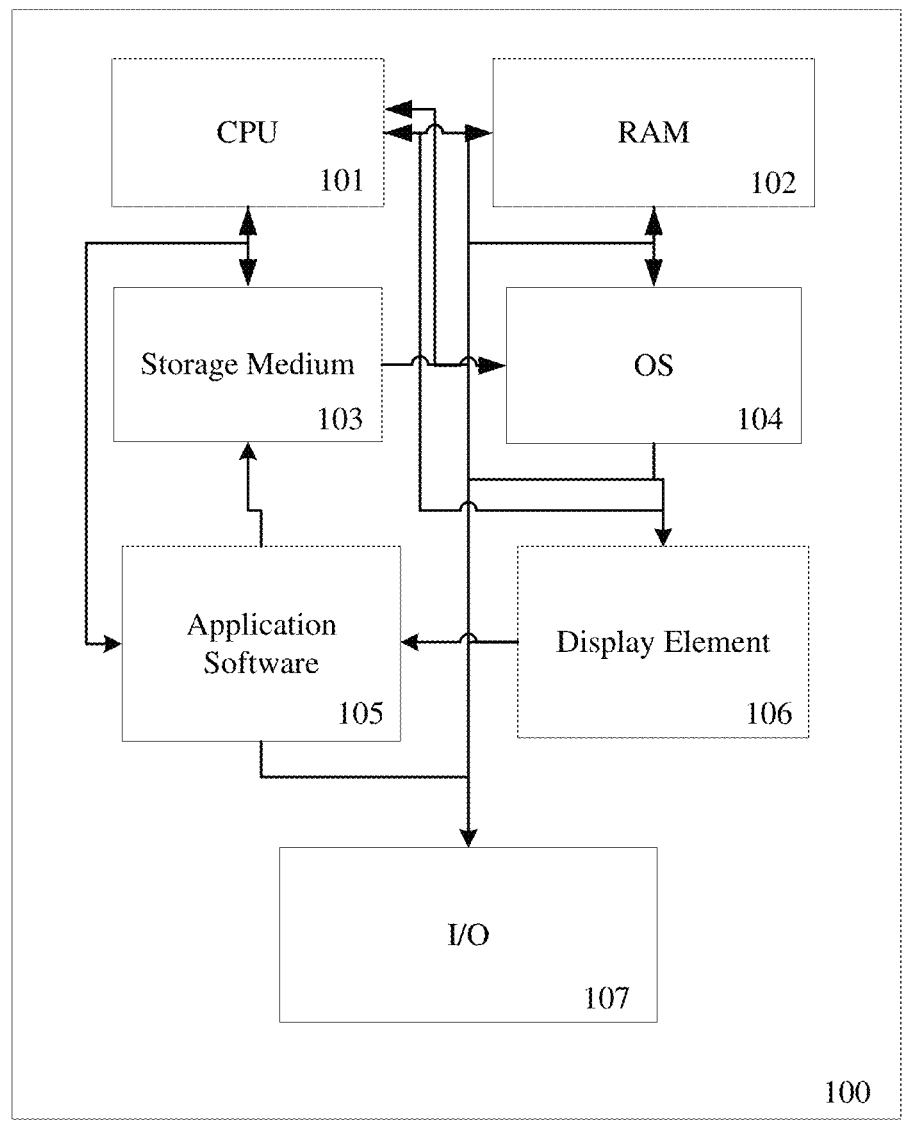
FIG. 10 is a schematic illustration of an exemplary computing device, in accordance with at least some exemplary embodiments of the present disclosure.

An illustrative representation of a computing device appropriate for use with embodiments of the system of the present disclosure is shown in FIG. 10. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 11, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 11:
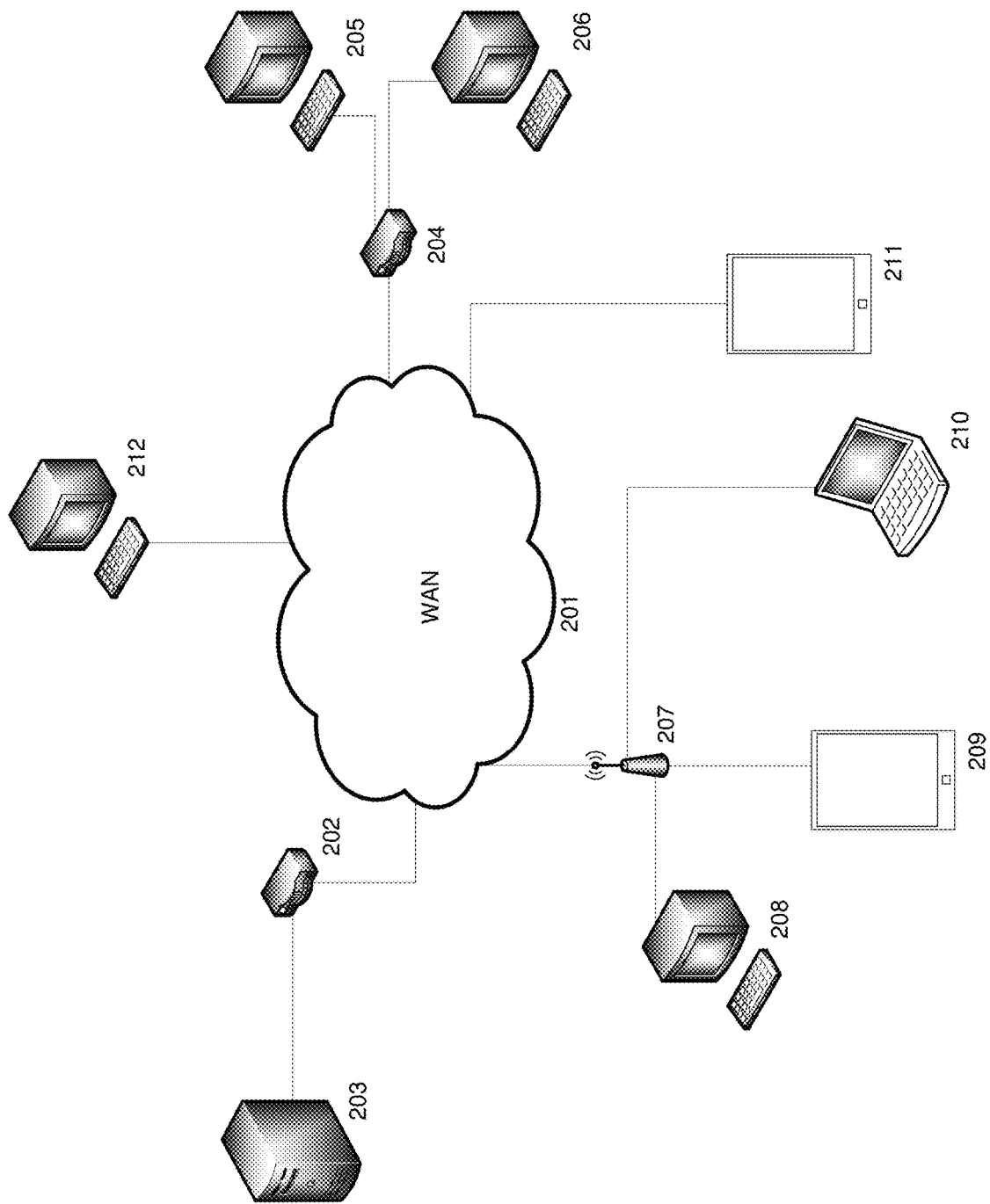
FIG. 11 is a schematic illustration of an exemplary network, in accordance with at least some exemplary embodiments of the present disclosure.

Referring to FIG. 11, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 11, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G, 5G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 12:
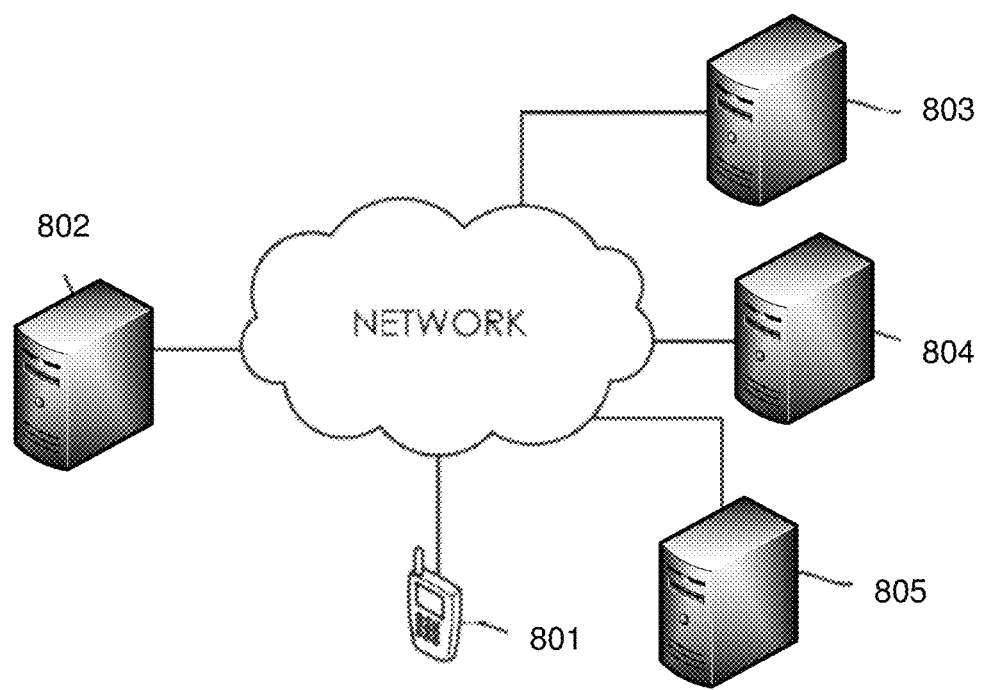
FIG. 12 is a schematic illustration of an exemplary network, in accordance with at least some exemplary embodiments of the present disclosure.

Turning now to FIG. 12, a continued schematic overview of a cloud-based system in accordance with an embodiment of the present invention is shown. For instance, a user of a mobile device 801 may be able to connect to application server 802. Application server 802 may be able to enhance or otherwise provide additional services to the user by requesting and receiving information from one or more of an external content provider API/website or other third party system 803, a constituent data service 804, one or more additional data services 805 or any combination thereof. Additionally, application server 802 may be able to enhance or otherwise provide additional services to an external content provider API/website or other third party system 803, a constituent data service 804, one or more additional data services 805 by providing information to those entities that is stored on a database that is connected to the application server 802. One of ordinary skill in the art would appreciate how accessing one or more third-party systems could augment the ability of the system described herein, and embodiments of the present invention are contemplated for use with any third-party system.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

In at least some exemplary embodiments, the exemplary disclosed system may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:

1. An emergency incident system, comprising:
an emergency incident module, comprising computer-executable code stored in non-volatile memory;
a computing device;
a sensor assembly; and
one or more user devices;
wherein the emergency incident module, the computing device, the sensor assembly, and the one or more user devices are configured to:
sense data of environmental conditions;
receive input of a first parameter data from one or more users;
determine at least one fluid throw based on the sensed data and the first parameter data;
display the at least one fluid throw to the one or more users;
receive input of a second parameter data from the one or more users; and
update the at least one fluid throw based on the sensed data and the second parameter data;
wherein displaying the at least one fluid throw to the one or more users includes displaying a shape defined by location coordinates on a map, the shape covered by the at least one fluid throw; and
wherein the shape is based on a range distance of the at least one fluid throw.

2. The emergency incident system of claim 1, wherein the emergency incident module, the computing device, the sensor assembly, and the one or more user devices are further configured to display the updated at least one fluid throw to the one or more users.

3. The emergency incident system of claim 1, wherein determining the at least one fluid throw includes calculating the location coordinates based on the sensed data and the first parameter data.

4. The emergency incident system of claim 3, wherein the at least one fluid throw is a geographic area covered by fire-suppressing fluid.

5. The emergency incident system of claim 1, wherein the sensor assembly includes at least one selected from the group of a temperature sensor, a humidity sensor, a wind sensor, a location sensor, and combinations thereof.

6. The emergency incident system of claim 1, wherein each of the first parameter data and the second parameter data includes at least one selected from the group of a water source, a hose or pipe size, a hose or pipe length, a source distance, a hose or pipe run, a stream or throw reach, a stream or throw reach with additive, a foam additive size, a throw radius, and combinations thereof.

7. The emergency incident system of claim 1, wherein updating the at least one fluid throw based on the sensed data and the second parameter data occurs in real-time or near real-time.

8. The emergency incident system of claim 1, wherein the sensed data includes at least one selected from the group of a temperature data, a humidity data, a wind speed data, a wind direction data, a location data, and combinations thereof.

9. A method, comprising:
sensing data of environmental conditions using a sensor assembly;
receiving input of a first parameter data from one or more users;
determining at least one first fluid throw based on the sensed data and the first parameter data using a computing device;
displaying the at least one first fluid throw to the one or more users via one or more user devices;
receiving input of a second parameter data from the one or more users;

determining at least one second fluid throw based on the sensed data and the second parameter data using a computing device; and displaying the at least one second fluid throw to the one or more users via the one or more user devices;

wherein displaying the at least one first fluid throw to the one or more users includes displaying a shape defined by a plurality of location coordinates on a map, the shape covered by the at least one first fluid throw; and wherein the shape is based on a range distance of the at least one first fluid throw.

10. The method of claim 9, wherein each of the first parameter data and the second parameter data includes at least one selected from the group of a water source, a hose or pipe size, a hose or pipe length, a source distance, a hose or pipe run, a stream or throw reach, a stream or throw reach with additive, a foam additive size, a throw radius, and combinations thereof.

11. The method of claim 9, wherein the sensed data includes at least one selected from the group of a temperature data, a humidity data, a wind speed data, a wind direction data, a location data, and combinations thereof.

12. The method of claim 9, further comprising updating the sensed data in real-time by transferring update sensed data from the sensor assembly to the computing device.

13. The method of claim 9, wherein the plurality of location coordinates are determined based on the sensed data and the first parameter data.

14. The method of claim 13, wherein the at least one first fluid throw and the at least one second fluid throw each depict a geographic area on the map covered by a fluid including at least one selected from the group of water, water including additives, fluorocarbon material, foam, and combinations thereof.

15. A fire incident system, comprising:
a fire incident module, comprising computer-executable code stored in non-volatile memory;
a computing device;
a sensor assembly; and
one or more user devices;
wherein the fire incident module, the computing device, the sensor assembly, and the one or more user devices are configured to:
sense data of environmental conditions;
receive input of a first parameter data from one or more users;
determine at least one first fire-suppressing fluid throw based on the sensed data and the first parameter data;
display the at least one first fire-suppressing fluid throw to the one or more users;
receive input of a second parameter data from the one or more users;
determine at least one second fire-suppressing fluid throw based on the sensed data and the second parameter data;
display the at least one second fire-suppressing fluid throw to the one or more users; and
update the sensed data in real-time;
wherein displaying the at least one first fire-suppressing fluid throw to the one or more users includes displaying a shape defined by a plurality of location coordinates on a map, the shape covered by the at least one first fire-suppressing fluid throw; and
wherein the shape is based on a range distance of the at least one first fire-suppressing fluid throw.

16. The fire incident system of claim 15, wherein the plurality of location coordinates are determined based on the sensed data and the first parameter data.

17. The fire incident system of claim 16, wherein the at least one first fire-suppressing fluid throw and the at least one second fire-suppressing fluid throw each depict a geographic area on the map covered by a fluid including at least one selected from the group of water, water including additives, fluorocarbon material, foam, and combinations thereof.

18. The fire incident system of claim 15, wherein each of the first parameter data and the second parameter data includes at least one selected from the group of a water source, a hose or pipe size, a hose or pipe length, a source distance, a hose or pipe run, a stream or throw reach, a stream or throw reach with additive, a foam additive size, a throw radius, and combinations thereof.

19. The fire incident system of claim 15, wherein the sensed data includes at least one selected from the group of a temperature data, a humidity data, a wind speed data, a wind direction data, a location data, and combinations thereof.

20. The emergency incident system of claim 1, wherein the shape is adjusted based on adjusting the range distance based on an additive being added to the at least one fluid throw.

* * * * *